US 12,352,506 B2

(12) United States Patent
Deivasigamani et al.

(10) Patent No.: US 12,352,506 B2
(45) Date of Patent: Jul. 8, 2025

(54) HEATING SYSTEM

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 264 days.

(21) Appl. No.: 18/081,654

(22) Filed: Dec. 14, 2022

(65) Prior Publication Data

US 2024/0200883 A1 Jun. 20, 2024

(51) Int. Cl.
*F28D 20/00* (2006.01)
*F24H 4/04* (2006.01)
*F24S 60/10* (2018.01)
*F28D 20/02* (2006.01)

(52) U.S. Cl.
CPC ............. *F28D 20/028* (2013.01); *F24H 4/04* (2013.01); *F24S 60/10* (2018.05); *F28D 2020/0078* (2013.01)

(58) Field of Classification Search
CPC .......... F24D 17/02; F24H 7/0433; F24H 4/04; F28D 20/028
See application file for complete search history.

(56) References Cited

U.S. PATENT DOCUMENTS

| 4,232,657 A | * | 11/1980 | Killorin | F24D 11/005 |
| | | | | 126/609 |
| 4,356,706 A | * | 11/1982 | Baumgarten | F24D 17/02 |
| | | | | 237/19 |
| 2010/0230071 A1 | * | 9/2010 | Slater | F24T 10/00 |
| | | | | 165/104.31 |

FOREIGN PATENT DOCUMENTS

| DE | 202010000485 U1 | * | 8/2010 | ............ F24D 11/003 |
| DE | 102010056370 A1 | * | 6/2012 | ......... F24D 17/0031 |
| DE | 202013001714 U1 | * | 8/2013 | ......... F24D 17/0078 |
| JP | 2007057159 A | * | 3/2007 | |

* cited by examiner

*Primary Examiner* — Eric S Ruppert
(74) *Attorney, Agent, or Firm* — Jona Patent Firm; Cheng Ning Jong; Tracy P. Jong

(57) ABSTRACT

A heating system including at least one thermal battery including a storage container for holding a fluid, an outlet fluid conductor through which the fluid exits the storage container, an inlet fluid conductor through which the fluid enters the storage container, a first valve interposed in the outlet fluid conductor; and a second valve interposed in the inlet fluid conductor, wherein each thermal battery is configured to be thermally chargeable and dischargeable by controlling the first valve and the second valve to allow a flow of the fluid in concert and to disallow a flow in concert.

14 Claims, 3 Drawing Sheets

HEATING SYSTEM

BACKGROUND OF THE INVENTION

1. The Field of the Invention

The present invention relates to an electric tankless heating system. More specifically, the present invention is directed to an electric tankless heating system composed of subsystems interconnected using a simplified fluid network.

2. Background Art

In water heating systems, the potential for *Legionella* is more pronounced in a tank system or a large fluid conductor, e.g., in a tank water heater, etc., due to the low velocity of the contents of the tank water heater and the contents that are disposed in a suitable temperature range for *Legionella* proliferation. Although one or more temperature sensors may be used for providing feedback to the heating of the contents of the tank water heater to achieve a setpoint temperature, the effect of stratification can cause layers of fluid having different temperatures. Therefore, although portions of the contents of a water heater may be disposed at a setpoint temperature that is unfavorable for *Legionella* proliferation, there potentially exists other portions that may be disposed at temperatures suitable for *Legionella* proliferation. Further, in a tank heating system, potable water is drawn from a large reservoir of heated water to meet a hot water demand, increasing the risk of *Legionella* proliferation as the opportunity for a tank heating system to harbor *Legionella* is significantly higher than a tankless heating system where hot potable water is prepared just-in-time.

Scaling and corrosion are longstanding problems encountered in the water heating industry which limit the life span of equipment. Although many corrosion and scale inhibitors are known and used in high temperature application, many of these systems have limitations and do not provide the type of protection to allow significant extension of equipment life span. Conventional water heaters cannot store potable water at a very high temp due to the potential for scaling and hence corrosion.

Solar heating systems or heaters have become increasingly popular solutions either as a supplemental heating system or as a sole heating system whether or not municipal electricity is available. Where thermal batteries and swing tanks are involved and are made to function in conjunction with solar heaters, the overall heating solutions are often complicated to set up, involving set up procedures which are not only challenging for trained professionals to set up but also difficult for a user to detect a problem or the root cause of a problem if they malfunction during use. Further, these systems are often not easily scalable as there is very little reuse in the way of common subsystems being sourced as modules that can be added or removed.

Thus, there is a need in the heating art for a system that is scalable and a system having subsystems that contribute to meet the overall heating demand in an efficient manner, i.e., according to the respective conditions of the subsystems at the time hot water is demanded. There exists a need for isolating thermal batteries not required to be involved in a thermal charging or discharging action from the rest of the heating system. There is also a need in the heating art for a system that can be installed and set up on site without significant knowledge on the part of the technician. This ensures the system is set up correctly on site without having to set up at factory, prior to delivery, which can incur significant additional shipping costs due to additional shipping weights caused mainly by working fluids in the system.

SUMMARY OF THE INVENTION

In accordance with the present invention, there is provided a heating system including at least one thermal battery including a storage container for holding a fluid, an outlet fluid conductor through which the fluid exits the storage container, an inlet fluid conductor through which the fluid enters the storage container, a first valve interposed in the outlet fluid conductor; and a second valve interposed in the inlet fluid conductor, wherein each thermal battery is configured to be thermally chargeable and dischargeable by controlling the first valve and the second valve to allow a flow of the fluid in concert and to disallow a flow in concert.

In one embodiment, the storage container is non-pressurized. In one embodiment, the at least one thermal battery further includes a fill valve configured to allow flow into the storage container. In one embodiment, the at least one thermal battery further includes a check valve for preventing exit of the fluid through the fill valve from the storage container. In one embodiment, the heating system further includes a heat transfer fluid conductor disposed through the fluid from an inlet point at the storage container to an outlet point at the storage container, the heat transfer fluid conductor configured to receive a second fluid at a first temperature at the inlet point and to supply the second fluid at a second temperature higher than the first temperature. In one embodiment, the heating system further includes more than one pump to draw the fluid through the outlet fluid conductor out of the at least one storage container. In one embodiment, at least one of the more than one pump is a variable speed pump. In one embodiment, the fluid is glycol. In one embodiment, the at least one thermal battery includes a glycol concentration sensor configured for detecting the concentration of the fluid to determine the suitability of the fluid to resist freezing. In one embodiment, the at least one thermal battery includes a controller and a glycol concentration sensor functionally connected to the controller, the controller configured for receiving data from the glycol concentration sensor and determining the suitability of the fluid to resist freezing based on a location data. In one embodiment, the storage container is configured to hold the fluid in at least two distinct temperatures, the outlet fluid conductor is disposed at a portion of the storage container exposed to the fluid disposed at a first temperature of the at least two distinct temperatures and the inlet fluid conductor is disposed at a portion of the storage container exposed to the fluid disposed at a second temperature of the at least two distinct temperatures, wherein the second temperature of the at least two distinct temperatures is higher than the first temperature of the at least two distinct temperatures. In one embodiment, the heating system further includes a fluid conductor disposed through the fluid from an inlet point at the storage container to an outlet point at the storage container, the fluid conductor configured to receive a second fluid at a first temperature at the inlet point and to supply the second fluid at a second temperature higher than the first temperature, the storage container is configured to hold the fluid in at least two distinct temperatures and the inlet point is disposed in the fluid at a third temperature of the at least two distinct temperatures, the outlet point is disposed in the fluid at a fourth temperature of the at least two distinct temperatures and the fourth temperature of the at least two distinct temperatures is higher than the third temperature of the at least two distinct temperatures. In one embodiment, the heating system further includes a heat source configured to supply the fluid with thermal energy. In one embodiment, the heat source is a heat source can be a solar heater, a heat pump, a resistive heater or any combinations thereof.

An object of the present invention is to provide a heating system having thermal batteries that can be isolated so that the thermal batteries responsible for contributing to heating can be selected.

Another object of the present invention is to provide a fluid heating system that is tankless to reduce the potential for the supplied fluid from contamination of pathogens, e.g., Legionella.

Another object of the present invention is to provide a heating system composed of subsystems interconnected using a simplified fluid network.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—heating system
4—thermal battery
5—storage container
6—heated fluid inlet
8—spent fluid outlet
10—water inlet
12—water outlet
14—isolation valve
16—isolation valve
18—inlet valve
20—coil isolation valve
22—bypass valve
24—pump
26—pump
28—fill valve
30—heat transfer fluid conductor, e.g., coil
32—opening, e.g., vent
34—glycol concentration sensor
36—level sensor
38—float switch
40—outlet fluid conductor
42—inlet fluid conductor
44—solar heater
46—pump
48—working fluid, e.g., glycol
50—inlet point
52—outlet point
54—resistive heater
56—bypass conductor
58—heat exchanger, e.g., gas cooler
60—heat source, e.g., heat pump
62—heat exchanger, e.g., gas cooler
64—heat source, e.g., heat pump
66—heat pump
68—check valve
70—fluid conductor
72—fluid conductor
74—fluid conductor
76—fluid conductor

PARTICULAR ADVANTAGES OF THE INVENTION

Installation and start-up of prior art solar-integrated heating systems require high levels of technical knowledge. In one embodiment of the present heating system, interconnections between components have been simplified, making the task of putting together the heating system a task manageable by personnel trained only for conventional heating systems and a task which does not require specific training unique to the heating systems with solar heater integration. Prior art heating systems with solar heater integration require complicated plumbing as one or more swing tanks are used.

If not installed and/or configured properly, prior art heating systems would not function correctly and may even be a safety hazard.

Detailed Description of a Preferred Embodiment

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
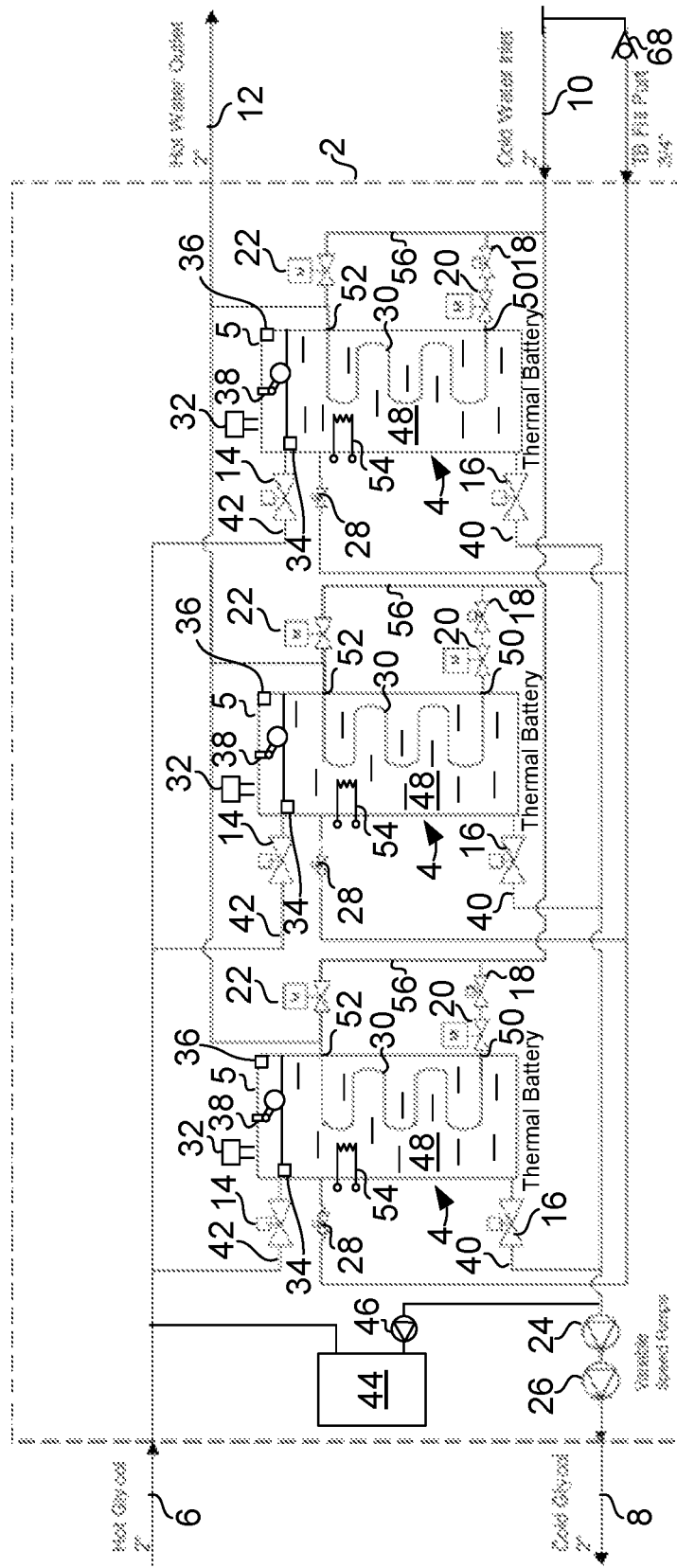
FIG. 1 is a diagram depicting an electric tankless heating system.

FIG. 1 is a diagram depicting an electric tankless heating system 2. Although three thermal batteries 4 are shown, the heating system needs only at least one thermal battery to function. To add thermal storage capacity, more thermal batteries of the type disclosed elsewhere can be added, making the storage capacity and hence the heating capacity of potable water scalable. Each thermal battery 4 includes a storage container for holding a fluid 48, an outlet fluid conductor 40 through which the fluid 48 exits the storage container 5, an inlet fluid conductor 42 through which the fluid enters the storage container 5, a first valve 16 interposed in the outlet fluid conductor 40 and a second valve 14 interposed in the inlet fluid conductor 42. Each thermal battery 4 is configured to be thermally chargeable and dischargeable by controlling the first valve 16 and the second valve 14 to allow a flow of the fluid 48 in concert and to disallow a flow in concert through the conductors 14, 16.

It shall be noted that for each thermal battery 4, as the flows through the inlet fluid conductor and the outlet fluid conductor are controlled using these two valves, each thermal battery 4 can be isolated from the rest of the heating system or brought back online to contribute to either charging or discharging of the thermal battery 4.

In one embodiment, the storage container is non-pressurized. The storage container 5 includes an opening 32 and is configured to hold a first fluid 48 therein. The opening 32 is configured to expose the first fluid 48 to atmospheric pressure. As such, the storage container 5 is not a pressurized vessel and not required to withstand pressure exerted by pressurized contents and therefore can be made to meet minimal requirements of a storage container, resulting in an inexpensive, easy-to-fabricate and maintain storage container. Contrast this to conventional thermal batteries where pressurized tanks are used. The container needs not be built to withstand a pressure higher than the ambient pressure and therefore no special materials and container wall thicknesses that are required to provide a container capable of withstanding pressure significantly higher than the ambient pressure. Such a container is therefore ubiquitous, has low procurement and maintenance costs. The thermal batteries 4 are connected in parallel to be filled during installation with the filling of each thermal battery 4 controlled by a fill valve 28. The fill valve-equipped lines are further connected to a check valve 68 which allows flow into the storage container while the fill valve/s are open while preventing exit of the fluid 48 into the cold water inlet 10. As the check valve 68 is connected to a potable water source, this eliminates the possibility that the potable water can be contaminated by a back flow of the fluid or working fluid, e.g., glycol into the potable water flow. In the embodiment shown, the heating system 2 further includes a heat transfer fluid conductor 30 disposed through the fluid 48 from an inlet point 50 at the storage container 5 to an outlet point 52 at the storage container 5, the heat transfer fluid conductor 30 is configured to receive a second fluid, e.g., potable water, at a first temperature at the inlet point 50 and to supply the second fluid at a second temperature higher than the first temperature. The rate at which heat is lost to the second fluid in the heat transfer fluid conductor 30 represents essentially the discharging rate of the thermal battery 4. In the embodiment shown, the heating system 2 further includes two pumps 24, 26 to draw the fluid through the outlet fluid conductor 40 out of storage containers 5 having their respective valves 16 open. In one embodiment, at least one of the pumps 24, 26 is a variable speed pump. In controlling the flow through the pumps 24, 26, the speed of a pump may be modulated to provide an optimal flowrate of the working fluid 48 to a heat exchanger connected to a heat source before returning to the storage container 5 through the inlet fluid conductor 42. During normal operations, the required flowrate may be met with only one pump turned on. However, in one mode, both are configured to turn on at an appropriate speed to result in the desired combined flowrate. In order to maintain the second fluid temperature at outlet 12, care must be taken to ensure that the rate at which contributing thermal batteries is charged is sufficient in meeting the thermal discharging rate. In one embodiment, the fluid 48 is glycol. In one embodiment, each thermal battery further includes a glycol concentration sensor 34 configured for detecting the concentration of the fluid 48 to determine the suitability of the fluid to resist freezing. In one embodiment, at least one thermal battery includes a controller and a glycol concentration sensor 36 functionally connected to the controller, the controller is configured for receiving data from the glycol concentration sensor 34 and determining the suitability of the fluid to resist freezing based on a location data. This is especially important if the heating system 2 and any plumbing connections may be exposed to the outdoor elements in temperate regions. In the embodiment shown, a fluid level sensor 36 is provided to allow the level of the storage container contents to be determined. This allows the exact level of the contents to be determined and the amount of glycol to be replenished in the storage containers 5. The level of the contents of the storage container can also be ascertained using a float switch 38 as the right content level causes the float switch to report a state indicating that the contents are disposed at an appropriate level.

It shall be noted that cold water is received at a cold water inlet 10 with an inlet pipe which connects the cold water inlet to the heat transfer fluid conductor 30. Heated water is supplied at a hot water outlet via an outlet pipe which connects the heat transfer fluid conductor 30 to the hot water outlet 12. The heat transfer fluid conductor is disposed through the fluid, e.g., glycol, from an inlet point 50 at the storage container 5 to an outlet point 52 at the storage container 5, the heat transfer fluid conductor 30, e.g., a coil, is configured to receive a second fluid at an inlet temperature at the inlet point 50 and to supply the second fluid, e.g., potable water, at an outlet temperature at the outlet point 52 that is higher than the inlet temperature.

The fluid 48 held in the storage container is stratified, i.e., the temperature of the fluid 48 near the top of the storage container 5 is disposed at a temperature higher than the first fluid near the bottom of the storage container 5. Therefore, the inlet point 50 is disposed in the fluid 48 at a first temperature and the outlet point is disposed in the fluid 48 at a second temperature where the second temperature is higher than the first temperature. As the first temperature is lower and the thermal energy of the contents in the lower region of the storage container has been largely depleted, this ensures that the fluid drawn by the pumps 24, 26 is devoid of thermal energy and ready to draw thermal energy from a heat source.

For each thermal battery 4, the heating system 2 further includes a bypass conductor 56 connecting an inlet and an outlet of the heat transfer fluid conductor 30. A valve 22 is interposed in the bypass conductor 56 to control the magnitude of a bypass flow that is allowed to occur through the bypass conductor 56. An inlet valve 18 is disposed at the inlet of the heat transfer fluid conductor 30 to control the magnitude of a flow through the heat transfer fluid conductor 30. A coil isolation valve 20 is connected to the inlet point 50, wherein the coil isolation valve 20 is configured for selectively allowing a flow of the second fluid. The coil isolation valve 20 serves as a fail-safe mechanism for an inlet valve 18 which fails as the coil isolation valve 20 is a spring-returned valve configured to close automatically should the inlet valve 18, e.g., a proportional valve fails. This way, a failed inlet valve 18 would not inadvertently cause a second fluid flow to be heated indefinitely in the thermal battery 4 to cause a scalding hot output at the outlet 12. Once the coil isolation valve 20 is closed, an incoming flow through the cold water inlet 10 will be diverted to the bypass conductor 56. A user of the demand will experience unheated water but will avoid potentially scalding hot water due to the failed inlet valve 18.

Figure 2:
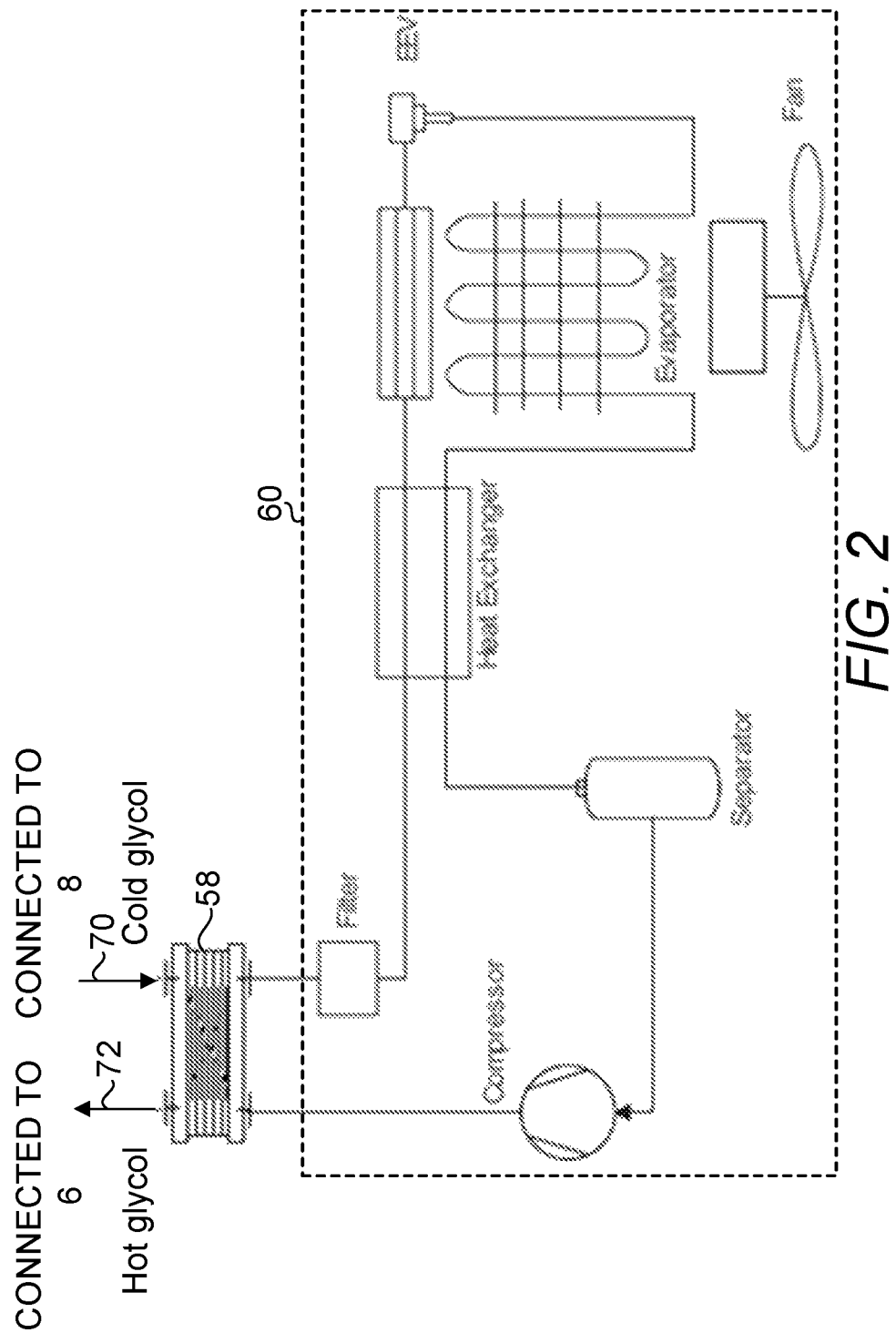
FIG. 2 is a diagram depicting a heat pump suitable to provide heat source to the heating system shown in FIG. 1.
Figure 3:
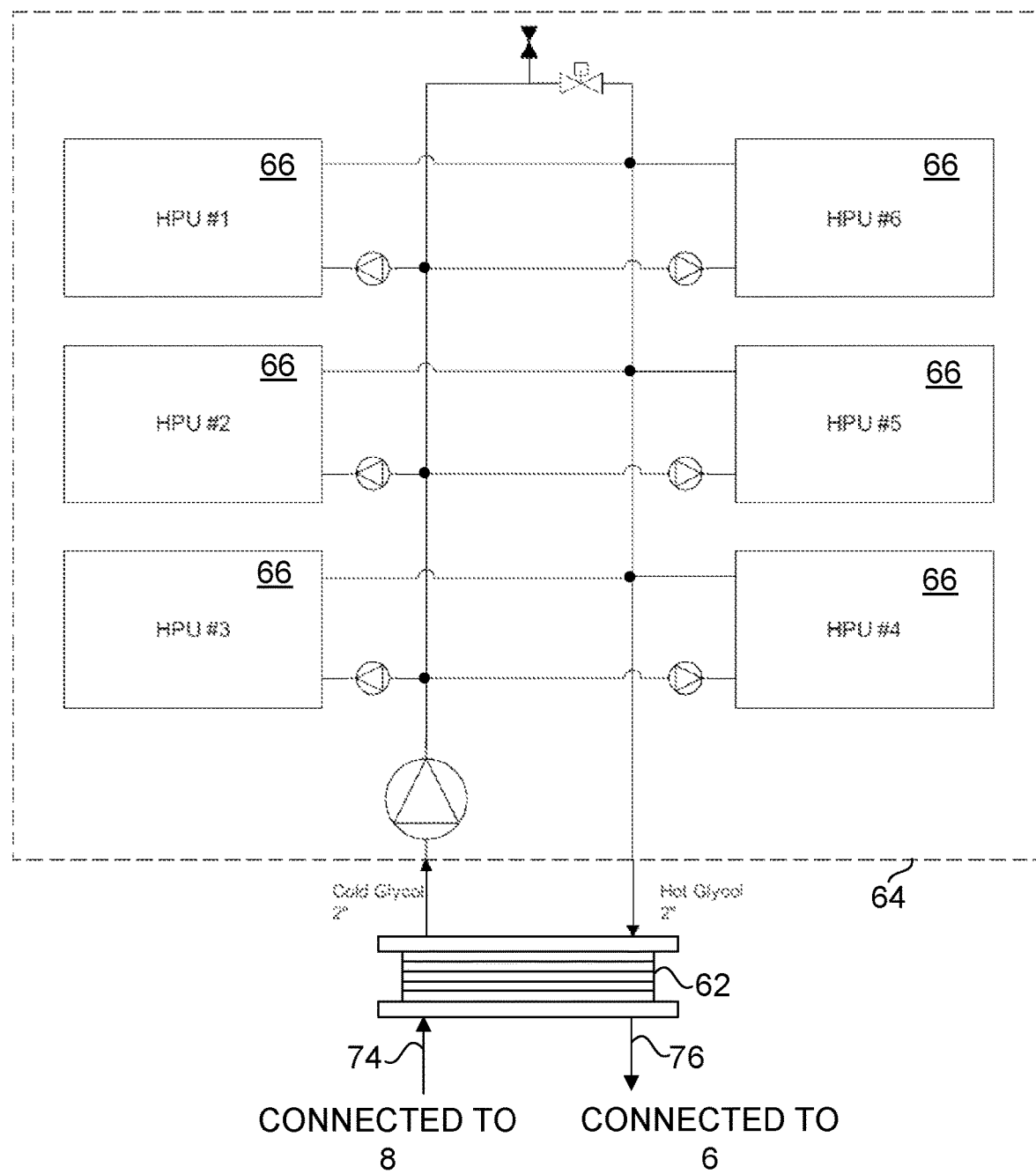
FIG. 3 is a diagram depicting a heating system suitable to provide heat source to the heating system shown in FIG. 1.

FIG. 2 is a diagram depicting a heat pump 60 suitable to provide heat source to the heating system 2 shown in FIG. 1. The spent fluid outlet 8 is connected to fluid conductor 70. The heated fluid inlet 6 is connected to fluid conductor 72. The heating system 2 shown in FIG. 1 is preferably installed in a temperature-controlled indoor environment to help preserve heat energy stored in the thermal batteries. The heating system 60 shown in FIG. 2 is preferably installed in an outdoor environment where there are no dedicated efforts necessary to ensure that the heat pump 60 is capable of causing air exchanges with the outdoor environment to harness heat energy from the outdoor environment. The heating system 2 shown in FIG. 1 need not be configured to be thermally connected only to the heat pump 60 shown in FIG. 2. As another example, the heating system 2 shown in FIG. 1 can be used in conjunction with a heating system including multiple outdoor heat pumps 66 configured to work together as a unit 64 as shown in FIG. 3. The spent fluid outlet 8 is connected to fluid conductor 74, the heated fluid inlet 6 is connected to fluid conductor 76 and both are connected to a heat exchanger 62 interfaced with heating system 2. Again, the heating system shown in FIG. 1 is preferably installed in a temperature-controlled indoor environment to help preserve heat energy stored in the thermal batteries. Again, the heating system 64 shown in FIG. 3 is preferably installed in an outdoor environment where there are no dedicated efforts necessary to ensure that the heat pumps are capable of causing air exchanges with the outdoor environment to harness heat energy from the outdoor environment. Referring back to FIG. 1, the spent fluid outlet 8 and the heated fluid inlet 6 can also be connected to a solar heater 44 that can assist in thermal charging the contents of the storage container 5 with the aid of a pump 46. Yet further, a resistive heater 54 may also serve as a heat source either to be the sole heat source if other heat sources are not available or a supplemental heat source to add thermal energy to the contents of the storage container 5.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A heating system comprising at least two thermal batteries each comprising a storage container for holding a fluid, an outlet fluid conductor through which the fluid exits said storage container, an inlet fluid conductor through which the fluid enters said storage container, a first valve interposed in said outlet fluid conductor; and a second valve interposed in said inlet fluid conductor, wherein each of said at least two thermal batteries is configured to be thermally chargeable and dischargeable by controlling said first valve and said second valve to allow a flow of the fluid in concert and to disallow a flow in concert and at least two heat transfer fluid conductors each disposed through the fluid of one of said at least two thermal batteries from an inlet point at a storage container of said one of said at least two thermal batteries to an outlet point at said storage container of said one of said at least two thermal batteries, each of said at least two heat transfer fluid conductors configured to receive a second fluid at a first temperature at said inlet point and to supply the second fluid at a second temperature higher than said first temperature and said at least two heat transfer fluid conductors are connected in parallel, the flow rate of said second fluid is controlled using a proportional valve at said inlet point to allow more than one of said at least two heat transfer fluid conductors to receive their respective second fluid simultaneously.

2. The heating system of claim 1, wherein said storage container is non-pressurized.

3. The heating system of claim 1, wherein said at least one thermal battery further comprises a fill valve configured to allow flow into said storage container.

4. The heating system of claim 3, wherein said at least one thermal battery further comprises a check valve for preventing exit of the fluid through said fill valve from said storage container.

5. The heating system of claim 1, further comprising more than one pump to draw the fluid through said outlet fluid conductor out of said at least one storage container.

6. The heating system of claim 5, wherein at least one of said more than one pump is a variable speed pump.

7. The heating system of claim 1, wherein the fluid is glycol.

8. The heating system of claim 7, wherein said at least one thermal battery comprises a glycol concentration sensor configured for detecting the concentration of the fluid to determine the suitability of the fluid to resist freezing.

9. The heating system of claim 7, wherein said at least one thermal battery comprises a controller and a glycol concentration sensor functionally connected to said controller, said controller configured for receiving data from said glycol concentration sensor and determining the suitability of the fluid to resist freezing based on a location data.

10. The heating system of claim 1, wherein said storage container is configured to hold the fluid in at least two distinct temperatures, said outlet fluid conductor is disposed at a portion of the storage container exposed to the fluid disposed at a first temperature of the at least two distinct temperatures and said inlet fluid conductor is disposed at a portion of the storage container exposed to the fluid disposed at a second temperature of the at least two distinct temperatures, wherein said second temperature of the at least two distinct temperatures is higher than said first temperature of the at least two distinct temperatures.

11. The heating system of claim 1, wherein said storage container is configured to hold the fluid in at least two distinct temperatures and said inlet point is disposed in the fluid at a third temperature of said at least two distinct temperatures, said outlet point is disposed in the fluid at a fourth temperature of said at least two distinct temperatures and said fourth temperature of said at least two distinct temperatures is higher than said third temperature of said at least two distinct temperatures.

12. The heating system of claim 1, further comprising a heat source configured to supply the fluid with thermal energy.

13. The heating system of claim 1, wherein said heat source is a heat source selected from the group consisting of a solar heater, a heat pump, a resistive heater and any combinations thereof.

14. The heating system of claim 1, further comprising a solar heater, wherein said solar heater is connected to said storage container via said outlet fluid conductor and said inlet fluid conductor.

\* \* \* \* \*